United States Patent
Maeno et al.

(10) Patent No.: US 12,094,275 B2
(45) Date of Patent: *Sep. 17, 2024

(54) INFORMATION PROCESSING APPARATUS, INFORMATION PROCESSING SYSTEM, AND INFORMATION PROCESSING METHOD

(71) Applicant: NEC Corporation, Tokyo (JP)

(72) Inventors: Yumi Maeno, Tokyo (JP); Takahiro Nishi, Tokyo (JP); Yutaro Nashimoto, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/902,280

(22) Filed: Sep. 2, 2022

(65) Prior Publication Data

US 2022/0415105 A1    Dec. 29, 2022

Related U.S. Application Data

(63) Continuation of application No. 16/589,514, filed on Oct. 1, 2019, now Pat. No. 11,468,722.

(30) Foreign Application Priority Data

Oct. 2, 2018    (JP) ................. 2018-187376

(51) Int. Cl.
| | |
|---|---|
| *G07C 9/00* | (2020.01) |
| *G06V 40/16* | (2022.01) |
| *H04L 67/10* | (2022.01) |

(52) U.S. Cl.
CPC ....... *G07C 9/00563* (2013.01); *G06V 40/172* (2022.01); *H04L 67/10* (2013.01)

(58) Field of Classification Search
CPC ........ G07C 9/00563; G07C 9/38; G07C 9/37; G06V 40/172; G06V 20/52; G06V 10/95; G06V 30/242; G06V 40/70; H04L 67/10
See application file for complete search history.

(56) References Cited

U.S. PATENT DOCUMENTS

| | | | |
|---|---|---|---|
| 8,085,992 B1 | 12/2011 | Sahin | ................. G06K 9/00255 382/115 |
| 2002/0191817 A1* | 12/2002 | Sato | .................... G06V 40/172 382/118 |

(Continued)

FOREIGN PATENT DOCUMENTS

| | | |
|---|---|---|
| JP | 2009-003659 A | 1/2009 |
| JP | 2010-079732 A | 4/2010 |

(Continued)

OTHER PUBLICATIONS

Japanese Office Action for JP Application No. 2018-187376 mailed on Jun. 23, 2022 with English Translation.

(Continued)

*Primary Examiner* — Solomon G Bezuayehu
(74) *Attorney, Agent, or Firm* — Sughrue Mion, PLLC

(57) ABSTRACT

An information processing apparatus in the present invention includes: an acquisition unit that, based on registration information including a plurality of registrants and registration time associated with each of the plurality of registrants and on the current time, acquires a first biometrics information group including biometrics information on a candidate of a matching process from a registered biometrics information group including biometrics information on the plurality of registrants; and a matching unit that matches biometrics information on a person detected from an image captured in a matching area against biometrics information included in the first biometrics information group.

22 Claims, 18 Drawing Sheets

(56) References Cited

U.S. PATENT DOCUMENTS

| | | | |
|---|---|---|---|
| 2005/0089198 A1 | 4/2005 | Ono | G06K 9/00255 382/115 |
| 2005/0185828 A1 | 8/2005 | Semba | G06K 9/00006 382/124 |
| 2012/0291111 A1 | 11/2012 | Kamakura | H04L 9/3231 726/7 |
| 2014/0133710 A1 | 5/2014 | Hama | G06F 21/32 382/115 |
| 2015/0033304 A1 | 1/2015 | Fujiwara | H04L 63/0861 726/6 |
| 2015/0254338 A1 | 9/2015 | Cheluvaraja | G06F 16/683 707/661 |
| 2016/0203305 A1 | 7/2016 | Suh | G06F 21/32 382/118 |
| 2016/0292493 A1* | 10/2016 | Gao | G06V 40/16 |
| 2018/0262336 A1 | 9/2018 | Fujiwara | H04L 9/083 |
| 2019/0147676 A1* | 5/2019 | Madzhunkov | G06F 21/32 340/5.2 |
| 2019/0197828 A1* | 6/2019 | Pettie | G07F 17/3244 |
| 2019/0213312 A1 | 7/2019 | Tussy | G06K 9/00925 |
| 2019/0355193 A1* | 11/2019 | Kirsch | G06V 20/52 |
| 2019/0371099 A1* | 12/2019 | Chen | G07C 9/00563 |
| 2020/0134954 A1* | 4/2020 | Yi | G07C 9/23 |
| 2020/0401682 A1 | 12/2020 | Lee | G06K 9/00892 |
| 2022/0084343 A1* | 3/2022 | Biswal | H04N 23/50 |

FOREIGN PATENT DOCUMENTS

| | | |
|---|---|---|
| JP | 2011-054026 A | 3/2011 |
| JP | 2014-214477 A | 11/2014 |
| JP | 2016-066241 A | 4/2016 |
| JP | 6246403 B1 | 12/2017 |
| JP | 2018-055138 A | 4/2018 |
| JP | 2018-120301 A | 8/2018 |

OTHER PUBLICATIONS

Japanese Office Action for JP Application No. 2018-187376 mailed on Apr. 7, 2022 with English Translation.

Japanese Office Action for JP Application No. 2018-187376 mailed on Feb. 15, 2022 with English Translation.

Japanese Patent Publication No. 2001-229380 (Uchida Naoya) (Year: 2001).

* cited by examiner

FIG. 5

Reservation information

| Reservation No. | Registrant ID | Reservation date and time | ... |
|---|---|---|---|
| 18-00101 | 05406 | [Reservation date and time t1] | ... |
| 18-00102 | 02103 | [Reservation date and time t2] | ... |
| 18-00103 | 00115 | [Reservation date and time t3] | ... |
| 18-00104 | 03508 | [Reservation date and time t4] | ... |
| 18-00105 | 09855 | [Reservation date and time t5] | ... |
| ... | ... | ... | ... |

FIG. 6

REGISTRANT INFORMATION

| Registrant ID | Name | Address | Contact information | Face image | Face feature amount | ⋮ |
|---|---|---|---|---|---|---|
| 00001 | [Name NM1] | [Address A1] | [Contact information C1] | 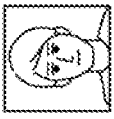 | [Face feature amount D1] | ⋮ |
| 00002 | [Name NM2] | [Address A2] | [Contact information C2] |  | [Face feature amount D2] | ⋮ |
| ⋮ | ⋮ | ⋮ | ⋮ | ⋮ | ⋮ | ⋮ |
| 01023 | [Name NM3] | [Address A3] | [Contact information C3] |  | [Face feature amount D3] | ⋮ |
| 01024 | [Name NM4] | [Address A4] | [Contact information C4] |  | [Face feature amount D4] | ⋮ |
| ⋮ | ⋮ | ⋮ | ⋮ | ⋮ | ⋮ | ⋮ |

FIG. 7

CANDIDATE INFORMATION

| SEQ | Face feature amount | DB registration date and time | ... |
|---|---|---|---|
| 00101 | [Face feature amount D5] | [registration date and time T1] | ... |
| 00102 | [Face feature amount D6] | [registration date and time T2] | ... |
| 00103 | [Face feature amount D11] | [registration date and time T3] | ... |
| 00104 | [Face feature amount D12] | [registration date and time T4] | ... |
| 00105 | [Face feature amount D18] | [registration date and time T5] | ... |
| ... | ... | ... | ... |

FIG. 18

| REGISTRANT INFORMATION | | | | | | |
|---|---|---|---|---|---|---|
| Registrant ID | Name | Address | Contact information | Face image | Face feature amount | Candidate flag |
| 00001 | [Name NM1] | [Address A1] | [Contact information C1] |  | [Face feature amount D1] | 0 |
| 00002 | [Name NM2] | [Address A2] | [Contact information C2] |  | [Face feature amount D2] | 1 |
| ... | ... | ... | ... | ... | ... | ... |
| 01023 | [Name NM3] | [Address A3] | [Contact information C3] |  | [Face feature amount D3] | 0 |
| 01024 | [Name NM4] | [Address A4] | [Contact information C4] |  | [Face feature amount D4] | 1 |
| ... | ... | ... | ... | ... | ... | ... |

INFORMATION PROCESSING APPARATUS, INFORMATION PROCESSING SYSTEM, AND INFORMATION PROCESSING METHOD

CROSS-REFERENCE TO RELATED APPLICATIONS

The present application is a continuation application of U.S. patent application Ser. No. 16/589,514 filed on Oct. 1, 2019, which claims the benefit of priority from Japanese Patent Application No. 2018-187376 filed on Oct. 2, 2018, the disclosures of all of which are incorporated in their entirety by reference herein.

TECHNICAL FIELD

The present invention relates to an information processing apparatus, an information processing system, and an information processing method.

BACKGROUND ART

Japanese Patent No. 6246403 discloses an entry and exit management system that has an authentication server configured to match input biometrics information against biometrics information on a registered user to perform identity verification and unlocks a gate based on authentication and permission from the authentication server.

SUMMARY

In the apparatus illustrated as an example in Japanese Patent No. 6246403, a face feature amount of a person captured in an authentication area is sequentially matched against face feature amounts of N registrants (N is an integer greater than one) registered in a database. Thus, as the population N of registrants becomes larger, the authentication accuracy or the authentication speed in the face recognition may decrease.

Accordingly, in view of the problem described above, the present invention intends to provide an information processing apparatus, an information processing system, and an information processing method that can improve the authentication accuracy and the authentication speed in face recognition.

According to one example aspect of the present invention, provided is an information processing apparatus including: an acquisition unit that, based on registration information including a plurality of registrants and registration time associated with each of the plurality of registrants and on the current time, acquires a first biometrics information group including biometrics information on a candidate of a matching process from a registered biometrics information group including biometrics information on the plurality of registrants; and a matching unit that matches biometrics information on a person detected from an image captured in a matching area against biometrics information included in the first biometrics information group.

According to another example aspect of the present invention, provided is an information processing apparatus including: a storage unit that stores a registered biometrics information group including biometrics information on a plurality of registrants; an identifying unit that, based on registration information including the plurality of registrants and registration time associated with each of the plurality of registrants and on the current time, identifies a first biometrics information group including biometrics information on a candidate of a matching process from the registered biometrics information group; and a matching unit that matches biometrics information on a person detected from an image captured in a matching area against biometrics information included in the first biometrics information group.

According to yet another example aspect of the present invention, provided is an information processing apparatus including: a storage unit that stores a registered biometrics information group including biometrics information on a plurality of registrants; an identifying unit that, based on registration information including the plurality of registrants and registration time associated with each of the plurality of registrants and on the current time, identifies a first biometrics information group including biometrics information on a candidate of a matching process from the registered biometrics information group; and an output unit that outputs the first biometrics information group for matching of biometrics information on a person detected in a matching area.

According to yet another example aspect of the present invention, provided is an information processing system including: a camera that captures a matching area to generate an image; a first server that stores a registered biometrics information group including biometrics information on a plurality of registrants and, based on registration information including the plurality of registrants and registration time associated with each of the plurality of registrants and on the current time, identifies a first biometrics information group including biometrics information on a candidate of a matching process from the registered biometrics information group; and a second server that matches biometrics information on a person detected from the image against biometrics information included in the first registered biometrics information group.

According to yet another example aspect of the present invention, provided is an information processing method including: based on registration information including a plurality of registrants and registration time associated with each of the plurality of registrants and on the current time, acquiring a first biometrics information group including biometrics information on a candidate of a matching process from registered biometrics information group including biometrics information on the plurality of registrants; and matching biometrics information on a person detected from an image captured in a matching area against biometrics information included in the first biometrics information group.

According to yet another example aspect of the present invention, provided is an program that causes a computer to perform: based on registration information including a plurality of registrants and registration time associated with each of the plurality of registrants and on the current time, acquiring a first biometrics information group including biometrics information on a candidate of a matching process from a registered biometrics information group including biometrics information on the plurality of registrants; and matching biometrics information on a person detected from an image captured in a matching area against biometrics information included in the first biometrics information group.

According to the present invention, it is possible to provide an information processing apparatus, an information processing system, and an information processing method that can improve the authentication accuracy and the authentication speed in face recognition.

BRIEF DESCRIPTION OF THE DRAWINGS

FIG. 5 is a diagram illustrating one example of reservation information stored in a reservation system in the first example embodiment.

FIG. 6 is a diagram illustrating one example of registrant information stored in the center server in the first example embodiment.

FIG. 7 is a diagram illustrating one example of candidate information stored in the relay server in the first example embodiment.

FIG. 18 is a diagram illustrating one example of information stored in a management server in a modified example embodiment.

EXAMPLE EMBODIMENT

Figure 1:
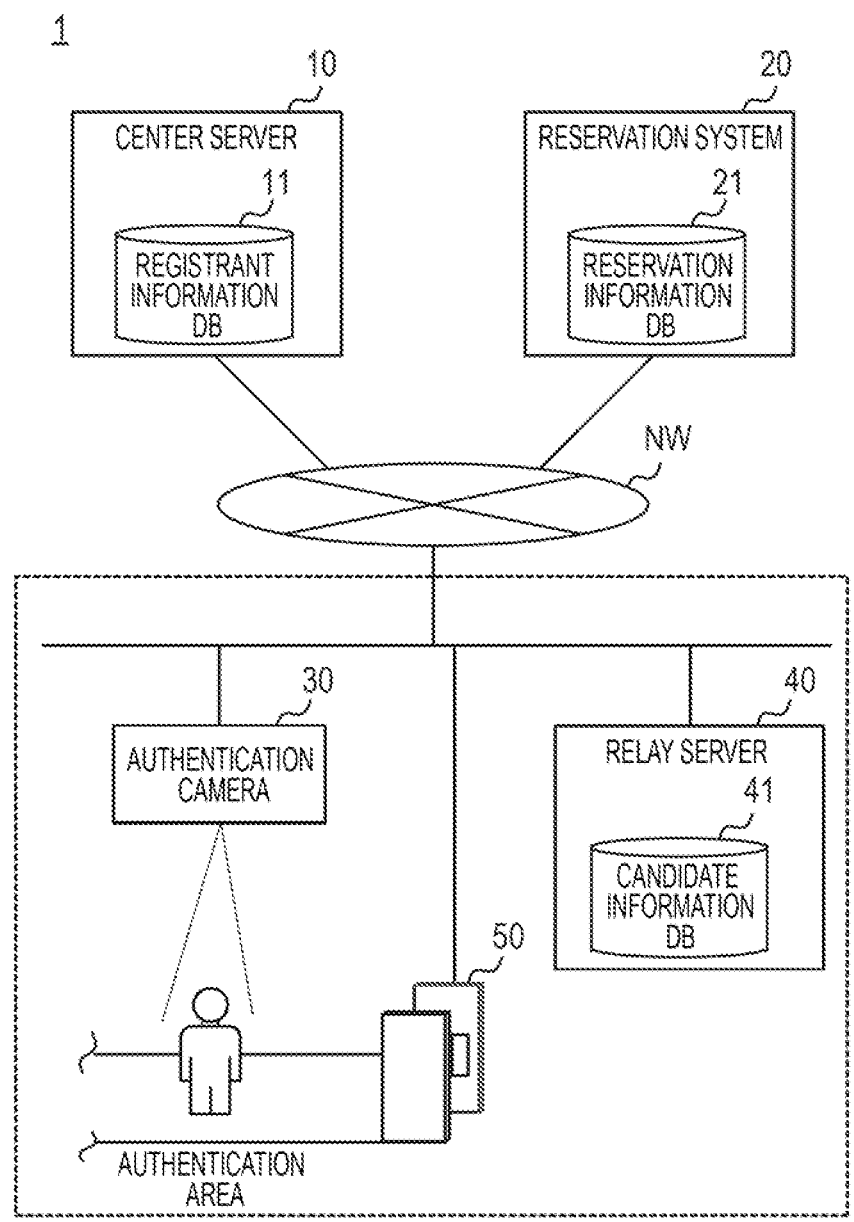
FIG. 1 is a diagram illustrating a general configuration example of an information processing system in a first example embodiment.

Illustrative example embodiments of the present invention will be described below with reference to the drawings. In the drawings, the same elements or corresponding elements are labeled with the same reference, and the description thereof may be omitted or simplified.

First Example Embodiment

The configuration of an information processing system 1 in the present example embodiment will be described with reference to FIG. 1 to FIG. 6. The information processing system 1 of the present example embodiment is a computer system that manages entry and exit of a number of persons by using a face recognition technology in a large scaled facility such as an event site, a theme park, a traffic facility (a railroad facility or an airport), a hotel, or the like, for example.

FIG. 1 is a diagram illustrating the entire configuration example of the information processing system 1 in the present example embodiment. As illustrated in FIG. 1, the information processing system 1 has a center server 10, a reservation system 20, an authentication camera 30, a relay server 40, and a gate apparatus 50. Each apparatus is connected to a network NW such as a Local Area Network (LAN) or the Internet. Note that the dashed-line box in FIG. 1 illustrates a base where management of entry and exit is performed. Other apparatuses than the center server 10 are installed inside the base.

The center server 10 is an information processing apparatus (first server) that centrally manages information on the base. While FIG. 1 illustrates only one base, the number of bases is not limited thereto. Further, the center server 10 has a registrant information database 11 that pre-stores biometrics information on a person who wishes to use this system (hereafter, referred to as "registrant"). The biometrics information may be a face image, a fingerprint image, an iris image, a finger vein image, a palm print image, a palm vein image, or the like. One or multiple pieces of biometrics information may be used.

Note that the term "biometrics information" in the present example embodiment means a face image and a feature amount extracted from the face image. A face image of a registrant is obtained by an image file being uploaded when the user makes online membership registration, for example. Further, the center server 10 and the relay server 40 each have a function of detecting biometrics information on a person from a received captured image. A feature amount extracted from a face image (also referred to as "face feature amount") may be an amount indicating a feature of a face such as a position of a characteristic part such as a pupil, a nose, a mouth end, for example.

The reservation system 20 is a computer system for reserving a use, reserving a service, or the like of a large scale facility such as an event site, a theme park, a transportation facility (a railroad facility or an airport), a hotel, or the like. For example, in a case of railroad facility, a ticket reservation system of Shinkansen, a commutation ticket selling system, or the like corresponds to the reservation system 20. The reservation system 20 has a reservation information database 21. Note that, while a case where a user (registrant) registered in the registrant information database 11 is a reserving person is described in the present example embodiment, a person other than the registrant may use the reservation system 20.

Figure 2:
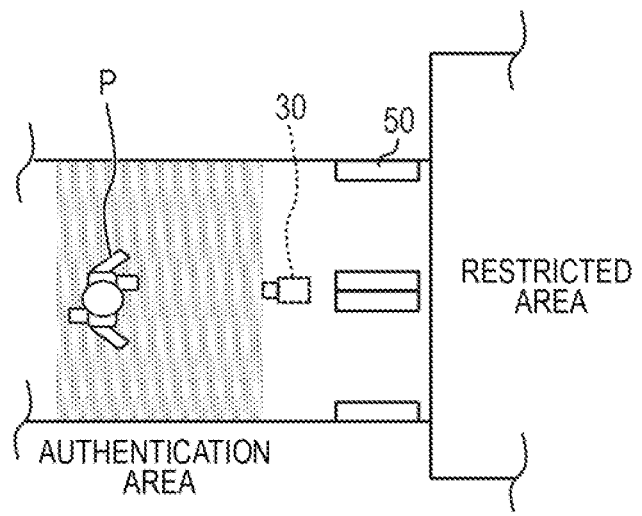
FIG. 2 is a diagram illustrating a positional relationship of an authentication area and a restricted area in the first example embodiment.

FIG. 2 is a diagram illustrating a positional relationship of an authentication area and a restricted area in the present example embodiment. As illustrated in FIG. 2, the authentication area is set in front of the gate apparatus 50 installed on the entrance side of the restricted area. The authentication camera 30 is an image capture device that captures the authentication area (matching area) and generates the captured image. In FIG. 2, since a person P is present inside the authentication area, the person P is detected from the captured image and is to be authenticated.

The center server 10 stores a registered biometrics information group including biometrics information on a plurality of registrants (registrant information) and identifies, from the registered biometrics information group, a first biometrics information group including biometrics information on a candidate in a matching process based on registration information including a plurality of registrants and registration time associated with each of the plurality of registrants (reservation information) and on the current time. The center server 10 then transmits the first biometrics information group refined from the registered biometrics information group (registrant information) to the relay server 40 as candidate information.

The relay server 40 is an information processing apparatus (second server) that performs a face recognition process of a person at each base. The relay server 40 matches biometrics information on a person detected from the image captured in the authentication area (hereafter, referred to as "authentication subject") against biometrics information included in the first biometrics information group. The relay server 40 has a candidate information database 41 that stores candidate information received from the center server 10 (first biometrics information group).

Figure 3:
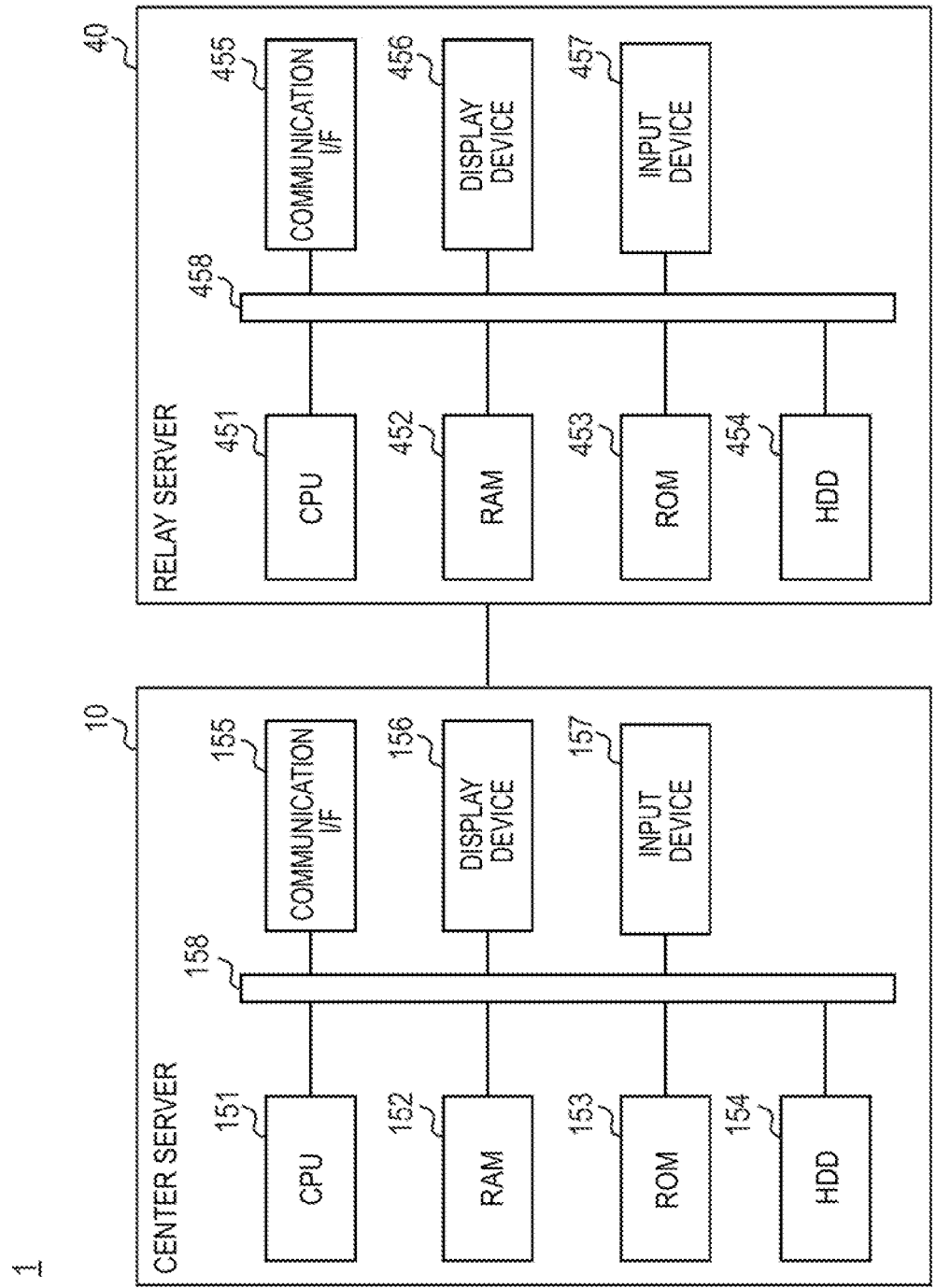
FIG. 3 is a block diagram illustrating a hardware configuration example of a center server and a relay server in the first example embodiment.

FIG. 3 is a block diagram illustrating a hardware configuration example of the center server 10 and the relay server 40. The center server 10 has a central processing unit (CPU) 151, a random access memory (RAM) 152, a read only memory (ROM) 153, and a hard disk drive (HDD) 154 as a computer that performs operation, control, and storage. Further, the information processing system 1 has a communication interface (I/F) 155, a display device 156, and an input device 157. The CPU 151, the RAM 152, the ROM 153, the HDD 154, the communication I/F 155, the display device 156, and the input device 157 are connected to each other via a bus 158. Note that the display device 156 and the input device 157 may be connected to the bus 158 via a drive device (not illustrated) used for driving these devices.

While the above components forming the center server 10 are illustrated as an integrated device in FIG. 3, some of these functions may be provided by an externally connected device. For example, the display device 156 and the input device 157 may be other externally connected devices other than a component forming a function of a computer including the CPU 151 or the like.

The CPU 151 is a processor having a function of performing a predetermined operation in accordance with a program stored in the ROM 153, the HDD 154, or the like and controlling each component of the center server 10. The RAM 152 is formed of a volatile storage medium and provides a temporal memory region necessary for the operation of the CPU 151. The ROM 153 is formed of nonvolatile storage medium and stores necessary information such as a program used for the operation of the center server 10. The HDD 154 is a storage device that is formed of a nonvolatile storage medium and stores data necessary for processing, an operation program of the center server 10, or the like.

The communication I/F 155 is a communication interface based on the specification such as Ethernet (registered trademark), Wi-Fi (registered trademark), 4G, or the like, which is a module used for communicating with other apparatuses. The display device 156 is a liquid crystal display, an OLED display, or the like and is used for displaying an image, a text, an interface, or the like. The input device 157 is a keyboard, a pointing device, or the like and is used by the user for operating the information processing system 1. An example of the pointing device may be a mouse, a trackball, a touchscreen, a pen tablet, or the like. The display device 156 and the input device 157 may be integrally formed as a touchscreen.

Note that, since the functions of a CPU 451, a RAM 452, a ROM 453, an HDD 454, a communication I/F 455, a display device 456, an input device 457, and a bus 458 provided in the relay server 40 are the same as the functions of the CPU 151, the RAM 152, the ROM 153, the HDD 154, the communication I/F 155, the display device 156, the input device 157, and the bus 158 of the center server 10, the description thereof will be omitted.

Further, the hardware configuration illustrated in FIG. 3 is an example, and other devices than the above may be added, or some of the devices may not be provided. Further, some of the devices may be replaced with another device having the same function. Furthermore, a part of the function of the present example embodiment may be provided by another device via a network, the function of the present example embodiment may be implemented by being distributed in a plurality of devices. For example, the HDD 154 may be replaced with a solid state drive (SSD) with a semiconductor memory or may be replaced with a cloud storage.

Figure 4:
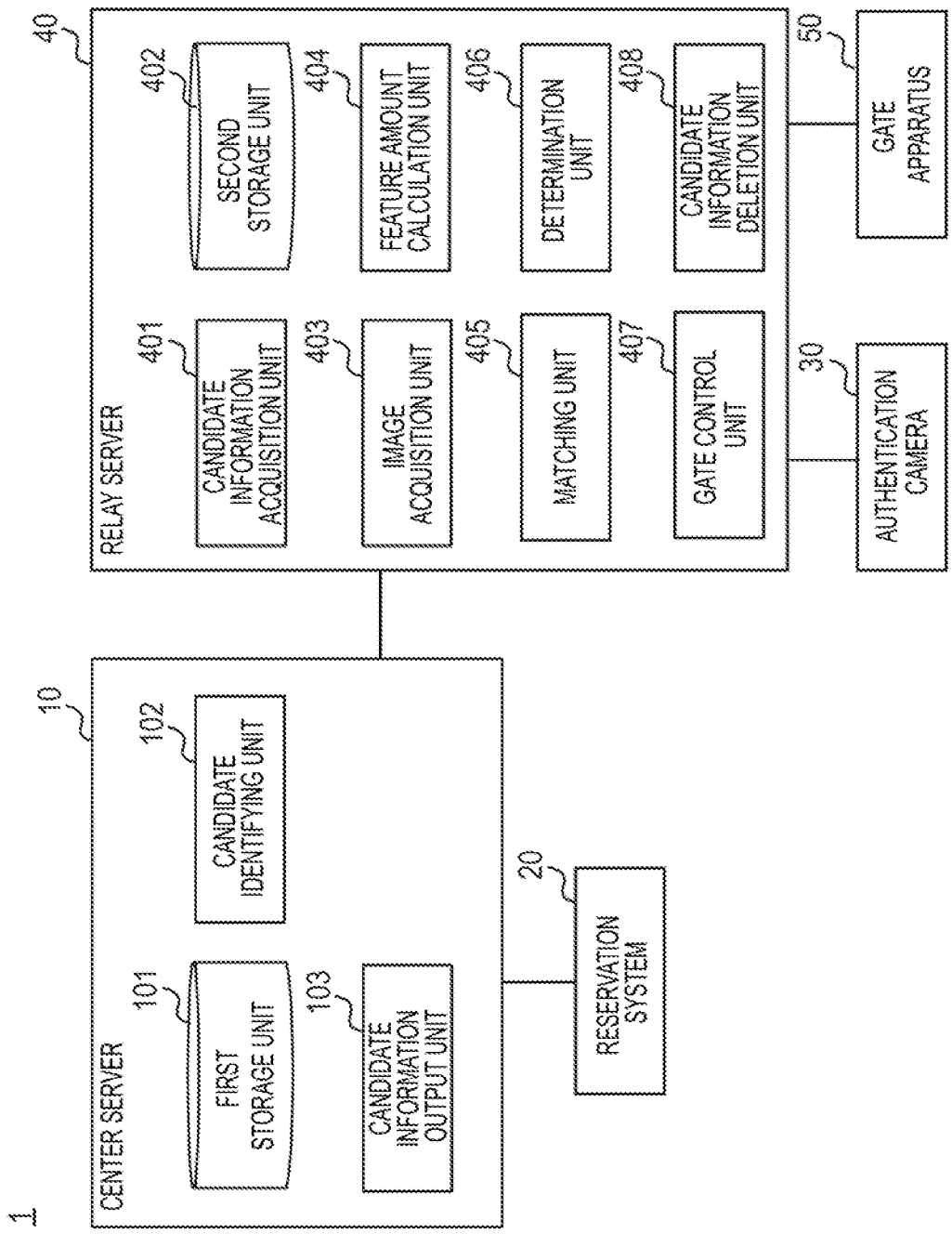
FIG. 4 is a functional block diagram of the information processing system in the first example embodiment.

FIG. 4 is a functional block diagram of the information processing system 1 in the present example embodiment. The center server 10 has a first storage unit 101, a candidate identifying unit 102, and a candidate information output unit 103. Further, the relay server 40 has a candidate information acquisition unit 401, a second storage unit 402, an image acquisition unit 403, a feature amount calculation unit 404, a matching unit 405, a determination unit 406, a gate control unit 407, and a candidate information deletion unit 408.

The CPU 151 of the center server 10 loads a program stored in the ROM 153, the HDD 154, or the like to the RAM 152 and executes the program. Thereby, the CPU 151 of the center server 10 implements the functions of the candidate identifying unit 102 and the candidate information output unit 103. Furthermore, the CPU 151 of the center server 10 implements the function of the first storage unit 101 by controlling the HDD 154. In the present example embodiment, the registrant information database 11 corresponds to the first storage unit 101.

Similarly, the CPU 451 of the relay server 40 loads a program stored in the ROM 453, the HDD 454, or the like to the RAM 452 and executes the program. Thereby, the CPU 451 of the relay server 40 implements the functions of the candidate information acquisition unit 401, the image acquisition unit 403, the feature amount calculation unit 404, the matching unit 405, the determination unit 406, the gate control unit 407, and the candidate information deletion unit 408. The process performed by each of these units will be described later. Furthermore, the CPU 451 of the relay server 40 implements the function of the second storage unit 402 by controlling the HDD 454. In the present example embodiment, the candidate information database 41 corresponds to the second storage unit 402.

FIG. 5 is a diagram illustrating one example of reservation information stored in the reservation system 20 (the reservation information database 21) in the present example embodiment. In this example, the data item of reservation information includes "reservation No", "registrant ID", and "reservation date and time". For example, in the reservation information for reservation No. "18-00101", the registrant ID is "05406", and the reservation date and time is "[reservation date and time t1]".

FIG. 6 is a diagram illustrating one example of registrant information stored in the center server 10 (the registrant information database 11) in the present example embodiment. In this example, the data item of registrant information includes "registrant ID", "name", "address", "contact information", "face image", and "face feature amount". For example, in the registrant information in which the registrant ID is "00001", the name of the registrant is "[name NM1]", the address is "[address A1]", and the contact information is "[contact information C1]". Further, it is indicated that the face feature amount (biometrics information) calculated from a face image of a person for the registrant ID "00001" is "[face feature amount D1]". Note that the registrant ID in the registrant information database 11 and the registrant ID in the reservation information database 21 described above correspond to each other.

FIG. 7 is a diagram illustrating one example of candidate information stored in the relay server 40 (the candidate information database 41) in the present example embodiment. In this example, the data item of candidate information includes "SEQ", "face feature amount", and "DB registration date and time". The SEQ indicates the order in which candidate information is received. The DB registration date and time indicates data and time (registration completion date and time) when candidate information received from the center server 10 is stored (registered) in the candidate information database 41. For example, in the candidate information for the SEQ "00101", it is indicated that the face feature amount is "[face feature amount D5]" and that the information is registered in the candidate information database 41 when the DB registration date and time is "[registration date and time t1]".

Figure 8:
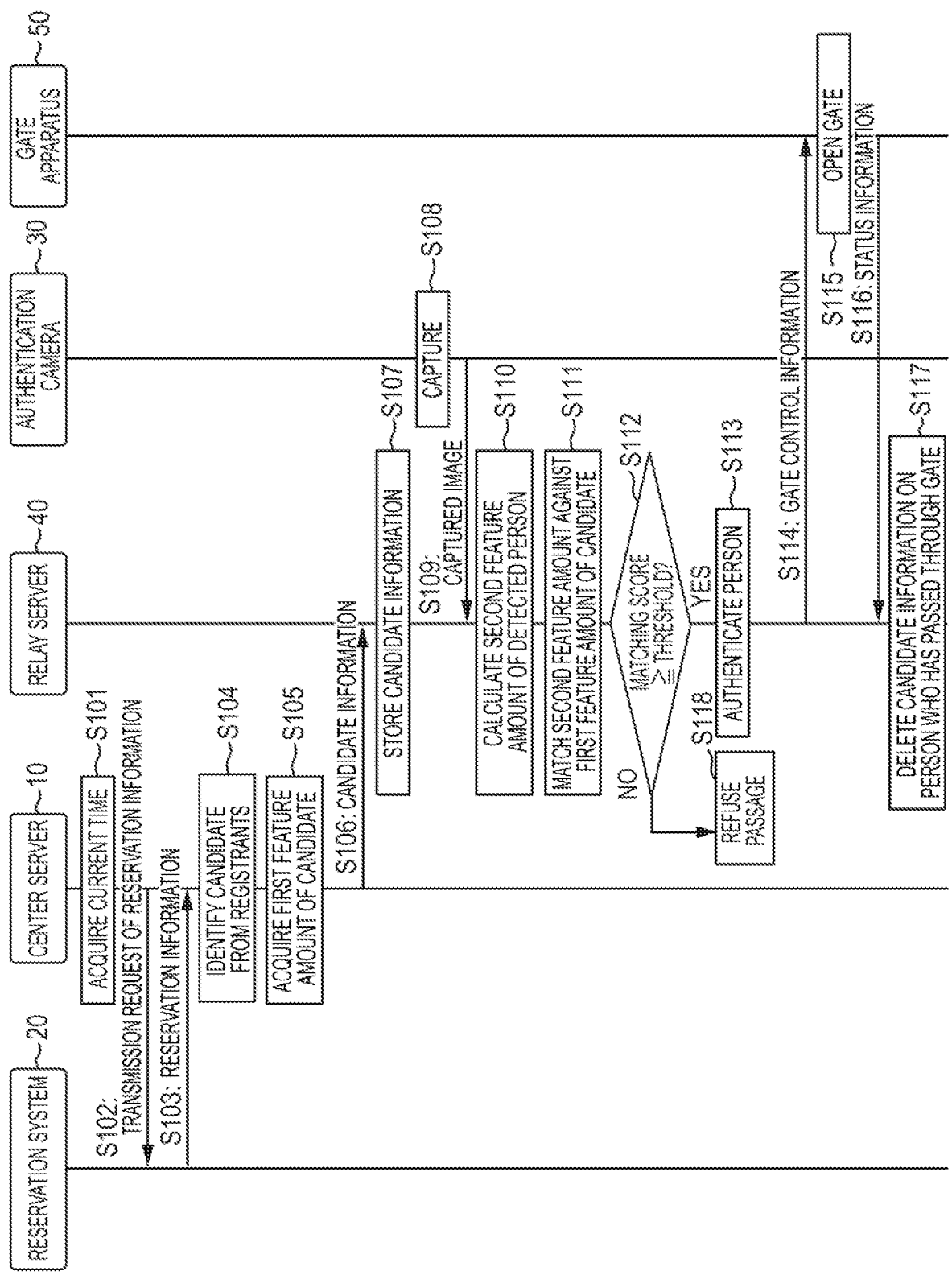
FIG. 8 is a sequence diagram illustrating one example of the process in the information processing system in the first example embodiment.

Next, the effect and advantage of the information processing system 1 in the present example embodiment will be described with reference to FIG. 8. FIG. 8 is a sequence diagram illustrating one example of the process in the information processing system 1 in the present example embodiment.

First, the center server 10 acquires the current time (step S101) and transmits, to the reservation system 20, a transmission request of reservation information in which a time period from the current time to the reservation time is within a predetermined time range (that is, matches an extraction condition) (step S102).

Next, in response to receiving the transmission request of reservation information, the reservation system extracts relevant reservation information from the reservation information database 21 based on the extraction condition included in the transmission request and transmits the extracted reservation information to the center server 10 (step S103). Note that the extraction condition can be set in any manner on the center server 10 side, such as (A) reservation information in a predetermined time range from the current time (for example, "reservation information in which the reservation time is within three hours from the current time") or (B) reservation information in a predetermined time range after the current time (for example, "reservation information in which reservation time is within a period from one hour after the current time to two hours after the current time"). The registrant in registration information in which the reservation time (registration time) is included within a predetermined time range is a target as a candidate from which biometrics information is acquired.

Next, the candidate identifying unit 102 of the center server 10 identifies a candidate from registrants stored in the registrant information database 11 based on the registrant ID included in the received reservation information (step S104) and acquires a first feature amount of the candidate (step S105).

Next, the candidate information output unit 103 of the center server 10 transmits, to the relay server 40, candidate information on a candidate identified from a plurality of registrants based on the current time and the reservation time (step S106). Next, the candidate information acquisition unit 401 of the relay server 40 stores the candidate information received from the center server 10 in the candidate information database 41 that is the second storage unit 402 (step S107).

The authentication camera 30 captures the authentication area (step S108) and transmits the captured image to the relay server 40 (step S109). Next, when the image acquisition unit 403 of the relay server 40 receives the captured image from the authentication camera 30, the feature amount calculation unit 404 calculates a second feature amount of a detected person (authentication subject) included in the received captured image (step S110). The matching unit 405 of the relay server 40 then matches the calculated second feature amount against the first feature amount of the candidate (step S111).

Next, the determination unit 406 of the relay server 40 determines whether or not the matching score between the second feature amount of the detected person and each of the first feature amounts of the candidates is greater than or equal to a predetermined threshold (determination reference value) (step S112). In this step, if the determination unit 406 of the relay server 40 determines that the matching score between the feature amounts is greater than or equal to the threshold (step S112: YES), the determination unit 406 identifies a candidate having the highest matching score between the feature out of the relevant candidates amounts and authenticates the detected person (step S113). That is, it is considered that the two feature amounts are matched. Next, the gate control unit 407 of the relay server 40 transmits gate control information to the gate apparatus 50 (step S114).

The gate apparatus 50 opens the gate based on the gate control information received from the relay server 40 (step S115) and, in response, transmits status information indicating the completion of gate opening to the relay server 40 (step S116).

If the determination unit 406 of the relay server 40 determines that the matching score between the feature amounts is less than the threshold (step S112: NO), the determination unit 406 performs determination on the detected person (authentication subject) as to whether or not to refuse passage (step S118) and ends the process. In this case, a closed state is maintained at the gate apparatus 50.

In step S117, the candidate information deletion unit 408 of the relay server 40 deletes, from the candidate information database 41 and ends the process, candidate information related to a person who has passed through the gate. Note that, while the above process has been described based on the condition where the initial state of the gate apparatus 50 is a closed state, the initial state may be an opened state. In such a case, when it is determined that the matching score is less than the threshold, the gate apparatus 50 is controlled from an open state to a closed state. Further, if the matching score is less than the threshold, an alert may be output from the gate apparatus 50 or the like by a voice, a light, a text, or the like, for example, instead of controlling the opening/closing operation of the gate apparatus 50.

The information processing system 1 in the present example embodiment extracts a first biometrics information group (registrant information) including biometrics information on a candidate of a matching process from registered biometrics information group (registrant information) including biometrics information on a plurality of registrants based on registration information (reservation information) including a plurality of registrants and registration time (reservation time) associated with each of the plurality of registrants and on the current time. Then, by matching biometrics information (second feature amount) on a person detected from an image captured in a matching area against biometrics information (first feature amount) included in the first biometrics information group, an authentication process on the detected person is performed. That is, since authentication is performed after the number of persons belonging to the population N of 1-to-N face recognition is significantly reduced, the authentication accuracy and the authentication speed in the authentication area can be significantly improved.

Further, the information processing system 1 in the present example embodiment is configured to, immediately after the passage of the gate, delete information on a candidate who has completed an authentication process. It is therefore possible to prevent unnecessary candidate information from being accumulated. As a result, it is possible to prevent a reduction in authentication accuracy and authentication speed in 1-to-N face recognition.

Second Example Embodiment

An information processing system 2 in a second example embodiment will be described below. Note that references common to references provided in the drawings of the first example embodiment denote the same object. Thus, the description of a part common to the first example embodiment will be omitted, and a different part will be described in detail.

Figure 9:
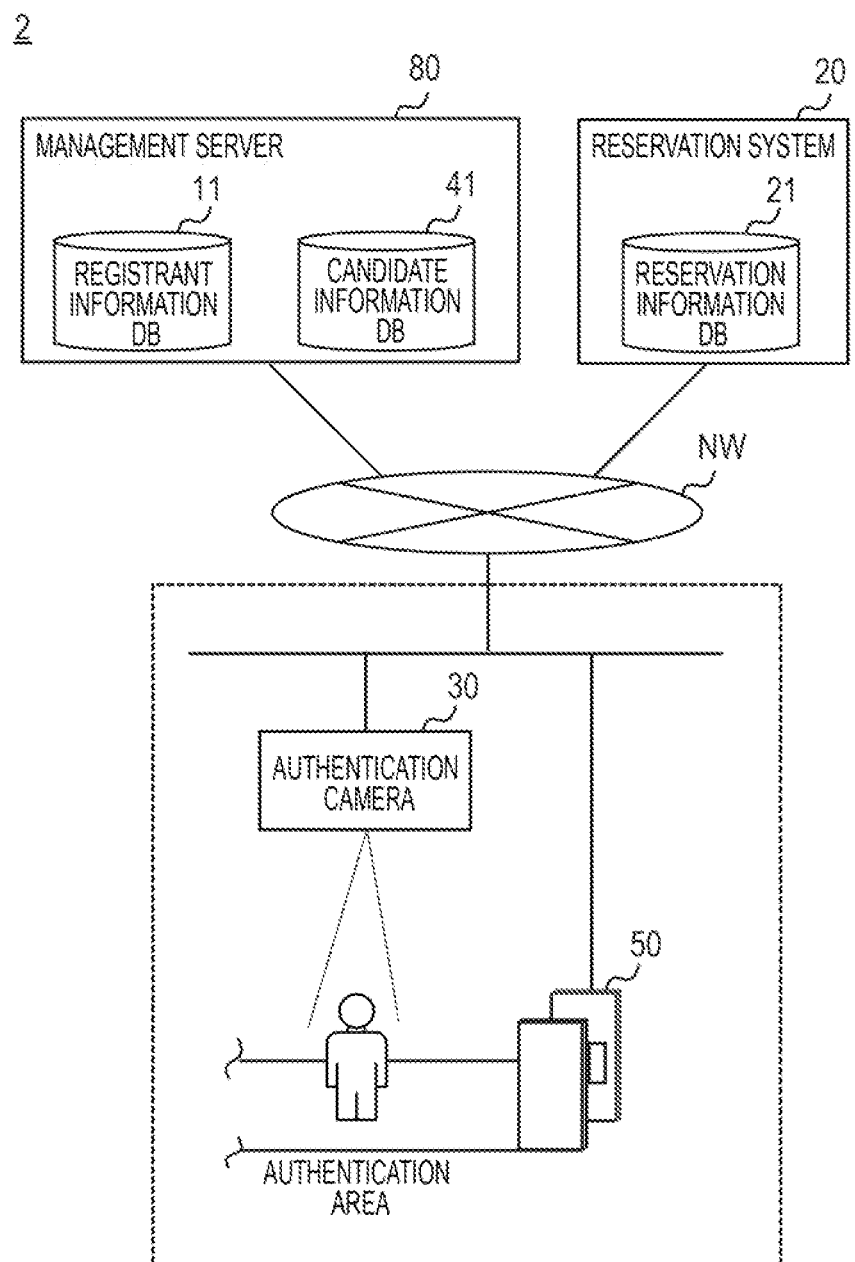
FIG. 9 is a functional block diagram of an information processing system in a second example embodiment.

FIG. 9 is a diagram illustrating the entire configuration example of the information processing system 2 in the present example embodiment. As illustrated in FIG. 9, the information processing system 2 is different from the first example embodiment in that, instead of the center server 10 and the relay server 40, a management server 80 in which the center server 10 and the relay server 40 are integrated is provided.

The management server 80 has the same function as the center server 10 and the relay server 40 illustrated in FIG. 4. Specifically, the management server 80 has both the registrant information database 11 (the first storage unit 101) and the candidate information database 41 (the second storage unit 402). Note that the function of transmitting and receiving information between servers is unnecessary due to the integration.

Figure 10:
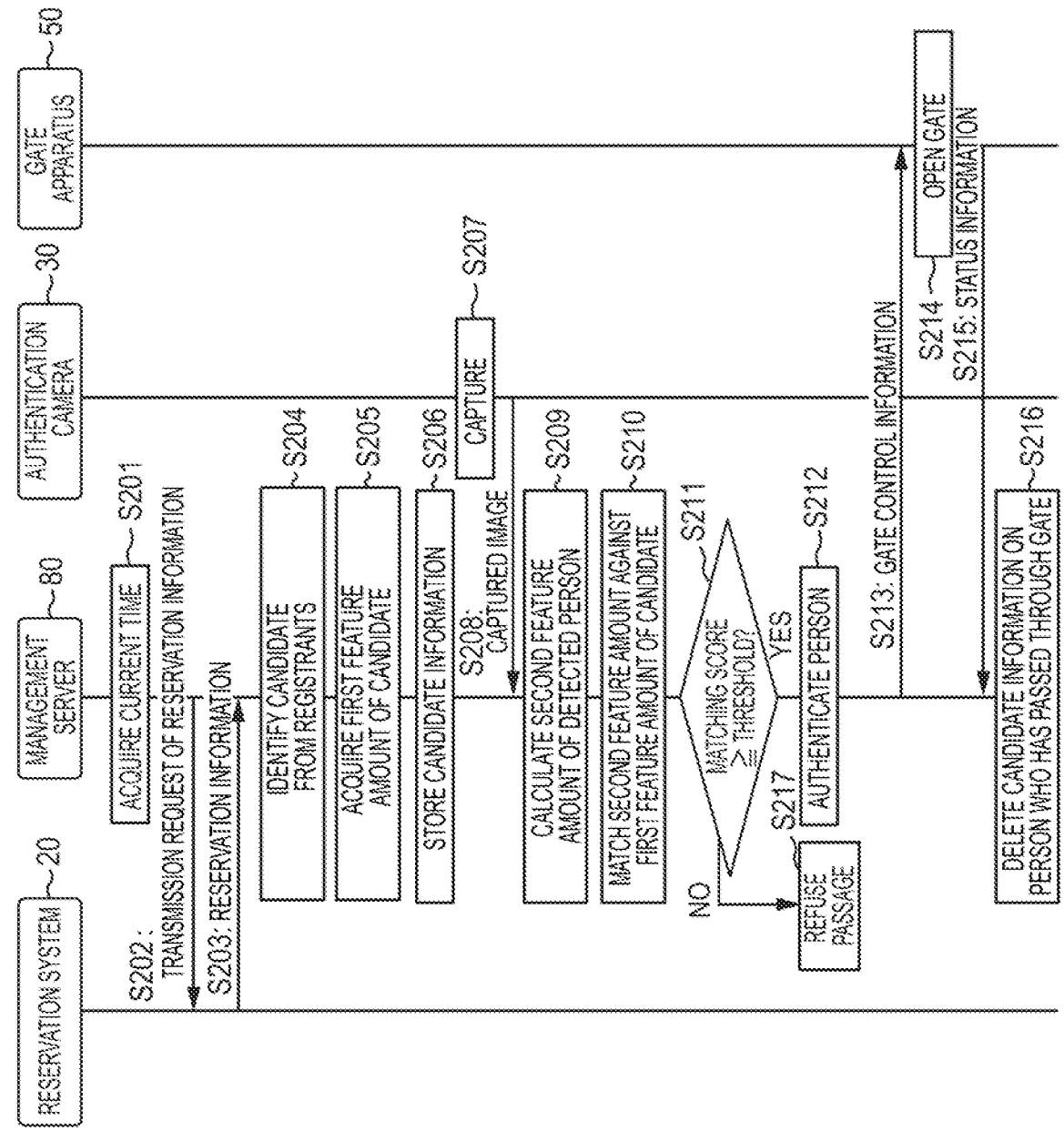
FIG. 10 is a sequence diagram illustrating one example of the process in the information processing system in the second example embodiment.

Next, the effect and advantage of the information processing system 2 in the present example embodiment will be described with reference to FIG. 10. FIG. 10 is a sequence diagram illustrating one example of the process in the information processing system 2 in the present example embodiment.

First, the management server 80 acquires the current time (step S201) and transmits, to the reservation system 20, a transmission request of the reservation information in which a time period from the current time to the reservation time is within a predetermined time range (that is, matches an extraction condition) (step S202).

Next, in response to receiving the transmission request of reservation information, the reservation system extracts relevant reservation information from the reservation information database 21 based on the extraction condition included in the transmission request and transmits the extracted reservation information to the management server 80 (step S203). Note that the extraction condition can be set in any manner on the management server 80 side, such as (A) reservation information in a predetermined time range from the current time (for example, "reservation information in which the reservation time is within three hours from the current time") or (B) reservation information in a predetermined time range after the current time (for example, "reservation information in which reservation time is within a period from one hour after the current time to two hours after the current time").

Next, the management server 80 identifies a candidate from registrants stored in the registrant information database 11 based on the registrant ID included in the received reservation information (step S204) and acquires a first feature amount of the candidate (candidate information) (step S205). Next, the management server 80 stores the candidate information in the candidate information database 41 that is the second storage unit 402 (step S206).

The authentication camera 30 captures the authentication area (step S207) and transmits the captured image to the management server 80 (step S208). Next, in response to receiving the captured image from the authentication camera 30, the management server 80 calculates a second feature amount of a detected person (authentication subject) included in the received captured image (step S209). The management server 80 then matches the calculated second feature amount against the first feature amount of the candidate (step S210).

Next, the management server 80 determines whether or not the matching score between the second feature amount of the detected person and each of the first feature amounts of the candidates is greater than or equal to a predetermined threshold (determination reference value) (step S211). In this step, if the management server 80 determines that the matching score between the feature amounts is greater than or equal to the threshold (step S211: YES), the management server 80 identifies a candidate having the highest matching score between feature amounts out of the relevant candidates and authenticates the detected person (step S212). Next, the management server 80 transmits gate control information to the gate apparatus 50 (step S213).

The gate apparatus 50 opens the gate based on the gate control information received from the management server 80 (step S214) and, in response, transmits status information indicating the completion of gate opening to the management server 80 (step S215).

If the management server 80 determines that the matching score between the feature amounts is less than the predetermined threshold (step S211: NO), the management server 80 performs determination on the detected person (authentication subject) as to whether or not to refuse passage (step S217) and ends the process. In this case, a closed state is maintained at the gate apparatus 50.

In step S216, the management server 80 deletes, from the candidate information database 41, candidate information related to a person who has passed through the gate and ends the process. Note that, while the above process has been described based on the condition where the initial state of the gate apparatus 50 is a closed state, the initial state may be an opened state. In such a case, when it is determined that the matching score is less than the threshold, the gate apparatus 50 is controlled from an open state to a closed state. Further, if the matching score is less than the threshold, an alert may be output from the gate apparatus 50 or the like by a voice, a light, a text, or the like, for example, instead of controlling the opening/closing operation of the gate apparatus 50.

The information processing system 2 in the present example embodiment is configured such that, unlike the first example embodiment described above, the management server 80 has the functions of a plurality of servers and thus has an advantage that eliminates transmission and reception of data between servers in addition to the advantages of the first example embodiment described above.

Third Example Embodiment

An information processing system 3 in a third example embodiment will be described below. Note that references common to references provided in the drawings of the first example embodiment denote the same object. Thus, the description of a part common to the first example embodiment will be omitted, and a different part will be described in detail.

Figure 11:
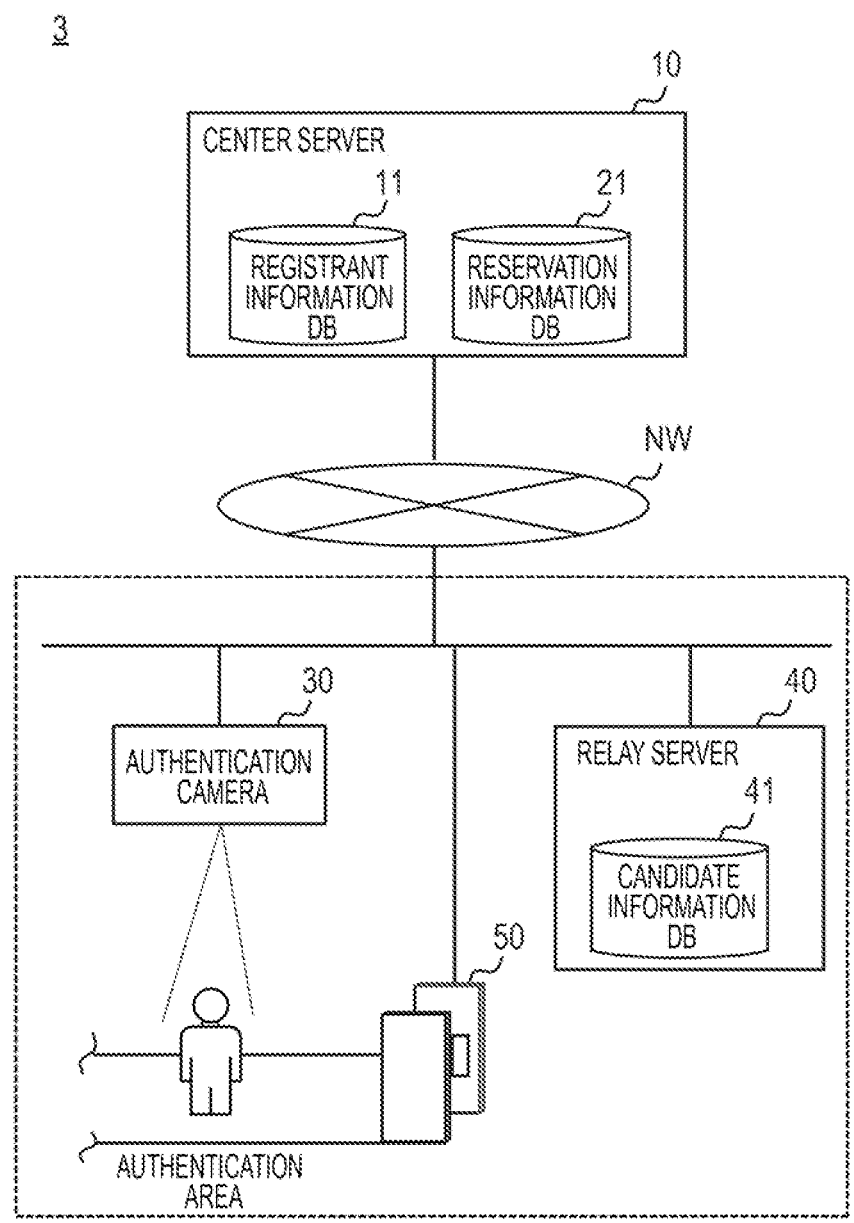
FIG. 11 is a diagram illustrating the entire configuration example of an information processing system in a third example embodiment.

FIG. 11 is a diagram illustrating the entire configuration example of the information processing system 3 in the present example embodiment. As illustrated in FIG. 11, the center server 10 is different from that of the first example embodiment in that a reservation information database 21 is provided in addition to the registrant information database 11. That is, the center server 10 of the present example embodiment further has the function of the reservation system 20 of the first example embodiment.

Figure 12:
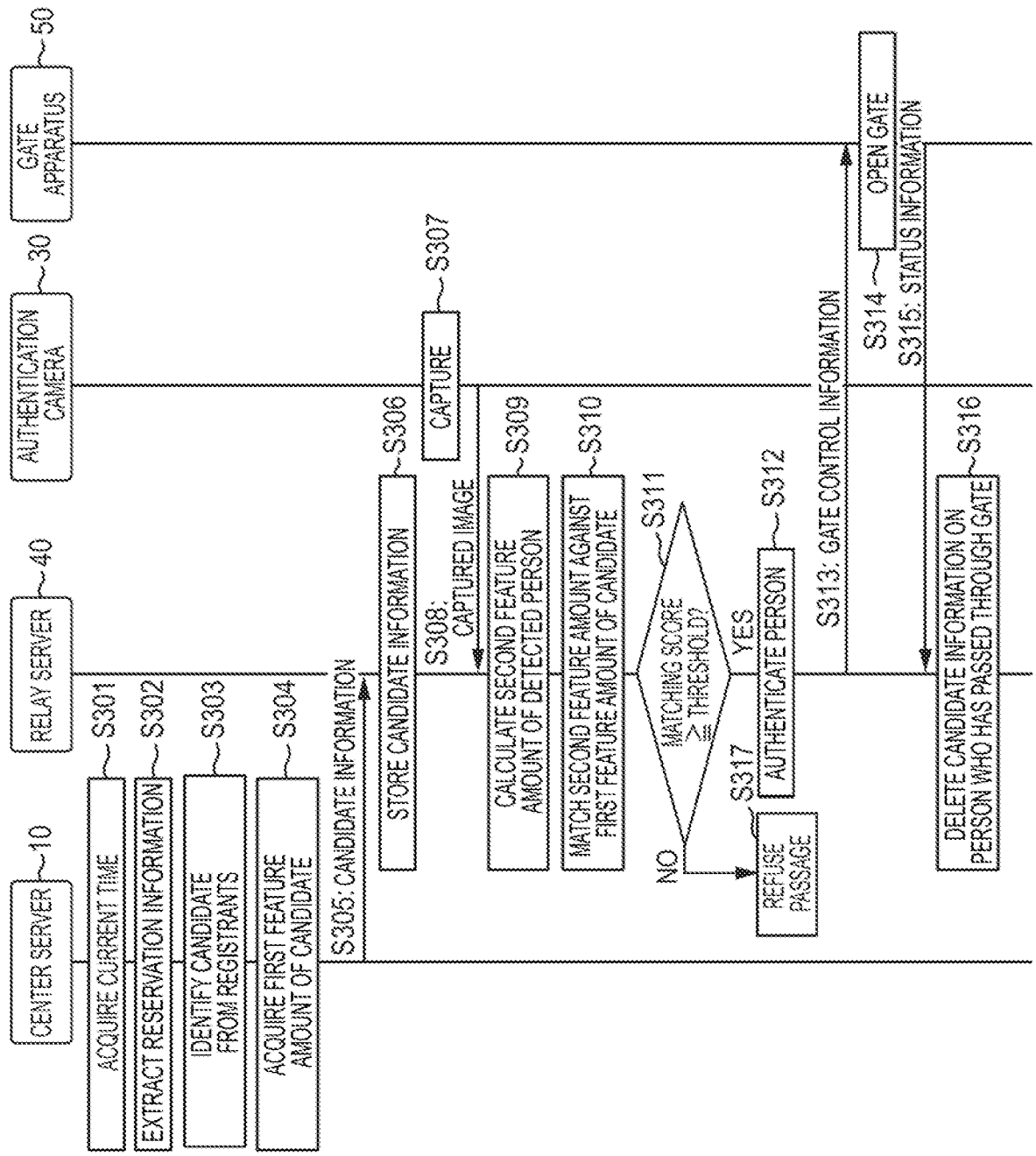
FIG. 12 is sequence diagram illustrating one example of a process in the information processing system in the third example embodiment.

Next, the effect and advantage of the information processing system 3 in the present example embodiment will be described with reference to FIG. 12. FIG. 12 is a sequence diagram illustrating one example of the process in the information processing system 3 in the present example embodiment.

First, the center server 10 acquires the current time (step S301) and, in response, extracts relevant reservation information from the reservation information database 21 based on a predetermined extraction condition (step S302). Note that the extraction condition can be set in any manner on the center server 10 side, such as (A) reservation information in a predetermined time range from the current time (for example, "reservation information in which the reservation time is within three hours from the current time") or (B) reservation information in a predetermined time range after the current time (for example, "reservation information in which reservation time is within a period from one hour after the current time to two hours after the current time").

Next, the center server 10 identifies a candidate from registrants stored in the registrant information database 11 based on the registrant ID included in the extracted reservation information (step S303) and acquires a first feature amount of the candidate (step S304).

Next, the center server 10 transmits, to the relay server 40, candidate information on a person identified from a plurality of registrants based on the current time and the reservation time (step S305). Next, the relay server 40 stores the candidate information received from the center server 10 in the candidate information database 41 that is the second storage unit 402 (step S306).

The authentication camera 30 captures the authentication area (step S307) and transmits the captured image to the relay server 40 (step S308). Next, in response to receiving the captured image from the authentication camera 30, the relay server 40 calculates a second feature amount of a detected person (authentication subject) included in the received captured image (step S309). The relay server 40 then matches the calculated second feature amount against the first feature amount of the candidate (step S310).

Next, the relay server 40 determines whether or not the matching score between the second feature amount of the detected person and each of the first feature amounts of the candidates is greater than or equal to a predetermined threshold (determination reference value) (step S311). In this step, if the relay server 40 determines that the matching score between the feature amounts is greater than or equal to the threshold (step S311: YES), the determination unit 406 identifies a candidate having the highest matching score between the feature amounts out of the relevant candidates and authenticates the detected person (step S312). Next, the relay server 40 transmits gate control information to the gate apparatus 50 (step S313).

The gate apparatus 50 opens the gate based on the gate control information received from the relay server 40 (step S314) and, in response, transmits status information indicating the completion of gate opening to the relay server 40 (step S315).

If the relay server 40 determines that the matching score between the feature amounts is less than the threshold (step S311: NO), the relay server 40 performs determination on the detected person (authentication subject) as to whether or not to refuse passage (step S317) and ends the process. In this case, a closed state is maintained at the gate apparatus 50.

In step S316, the relay server 40 deletes, from the candidate information database 41, candidate information related to a person who has passed through the gate and ends the process. Note that, while the above process has been described based on the condition where the initial state of the gate apparatus 50 is a closed state, the initial state may be an opened state. In such a case, when it is determined that the matching score is less than the threshold, the gate apparatus 50 is controlled from an open state to a closed state. Further, if the matching score is less than the threshold, an alert may be output from the gate apparatus 50 or the like by a voice, a light, a text, or the like, for example, instead of controlling the opening/closing operation of the gate apparatus 50.

The information processing system 3 in the present example embodiment is configured such that, unlike the first example embodiment described above, the center server 10 further has the reservation information database 21 and thus has advantages such as that transmission and reception of data between systems are no longer necessary, that attribute information and reservation information on a registrant can be centrally managed, or the like in addition to the advantages of the first example embodiment described above.

Fourth Example Embodiment

Figure 13:
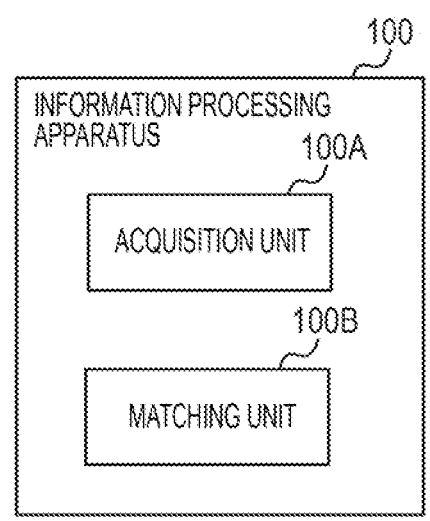
FIG. 13 is a functional block diagram of an information processing apparatus in a fourth example embodiment.

FIG. 13 is a functional block diagram of an information processing apparatus 100 in a fourth example embodiment. As illustrated in FIG. 13, the information processing apparatus 100 has an acquisition unit 100A and a matching unit 100B. The acquisition unit 100A acquires a first biometrics information group including biometrics information on a candidate of a matching process from a registered biometrics information group including biometrics information on a plurality of registrants based on registration information including a plurality of registrants and registration time associated with each of the plurality of registrants and on the current time. The matching unit 100B matches biometrics information on a person detected from an image captured in a matching area against biometrics information included in the first biometrics information group. The information processing apparatus 100 in the present example embodiment can improve the authentication accuracy and the authentication speed in face recognition.

Fifth Example Embodiment

Figure 14:
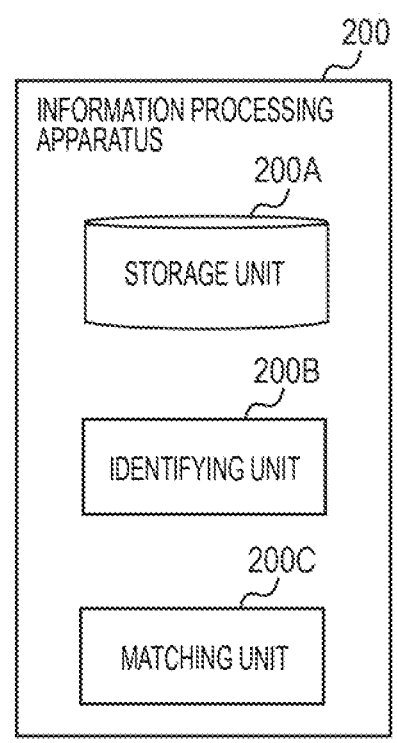
FIG. 14 is a functional block diagram of an information processing apparatus in a fifth example embodiment.

FIG. 14 is a functional block diagram of an information processing apparatus 200 in a fifth example embodiment. As illustrated in FIG. 14, the information processing apparatus 200 has a storage unit 200A, an identifying unit 200B, and a matching unit 200C. The storage unit 200A stores a registered biometrics information group including biometrics information on a plurality of registrants. The identifying unit 200B identifies a first biometrics information group including biometrics information on a candidate of a matching process from a registered biometrics information group based on registration information including a plurality of registrants and registration time associated with each of the plurality of registrants and on the current time. The matching unit 200C matches biometrics information on a person detected from an image captured in a matching area against biometrics information included in the first biometrics information group. The information processing apparatus 200 in the present example embodiment can improve the authentication accuracy and the authentication speed in face recognition.

Sixth Example Embodiment

Figure 15:
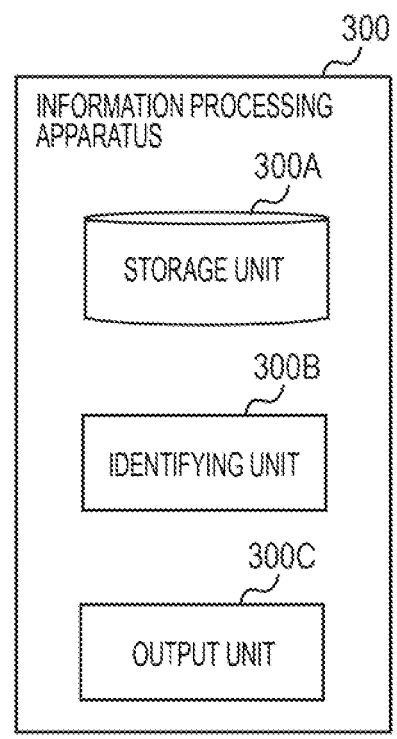
FIG. 15 is a functional block diagram of an information processing apparatus in a sixth example embodiment.

FIG. 15 is a functional block diagram of an information processing apparatus 300 in a sixth example embodiment. As illustrated in FIG. 15, the information processing apparatus 300 has a storage unit 300A, an identifying unit 300B, and an output unit 300C. The storage unit 300A stores a registered biometrics information group including biometrics information on a plurality of registrants. The identifying unit 300B identifies a first biometrics information group including biometrics information on a candidate of a matching process from a registered biometrics information group based on registration information including a plurality of registrants and registration information associated with each of the plurality of registrants and on the current time. The output unit 300C outputs the first biometrics information group used for a matching operation of biometrics information on a person detected in a matching area. The information processing apparatus 300 in the present example embodiment can improve the authentication accuracy and the authentication speed in face recognition.

Seventh Example Embodiment

Figure 16:
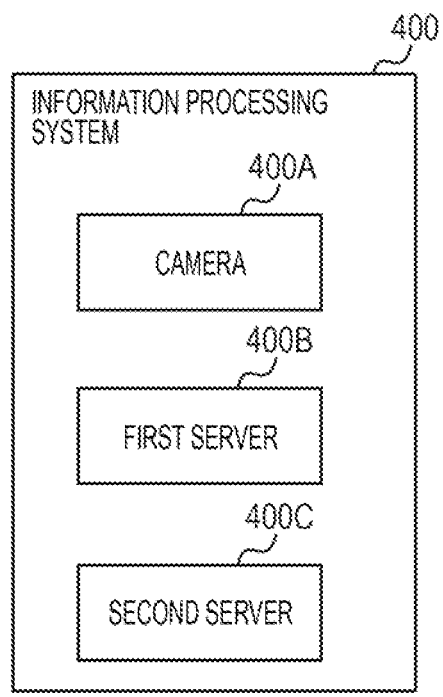
FIG. 16 is a functional block diagram of an information processing system in a seventh example embodiment.

FIG. 16 is a functional block diagram of an information processing system 400 in a seventh example embodiment. As illustrated in FIG. 16, the information processing system 400 has a camera 400A, a first server 400B, and a second server 400C. The camera 400A captures a matching area to generate an image. The first server 400B stores a registered biometrics information group including biometrics information on a plurality of registrants and identifies a first biometrics information group including biometrics information on a candidate of a matching process from a registered biometrics information group based on registration time including a plurality of registrants and registration information associated with each of the plurality of registrants and on the current time. The second server 400C matches biometrics information on a person detected from the image against biometrics information included in the first biometrics information group. The information processing system 400 in the present example embodiment can improve the authentication accuracy and the authentication speed in face recognition.

Modified Example Embodiments

The present invention can be appropriately changed within the scope not departing from the spirit of the present invention without being limited to the example embodiments described above.

Figure 17:
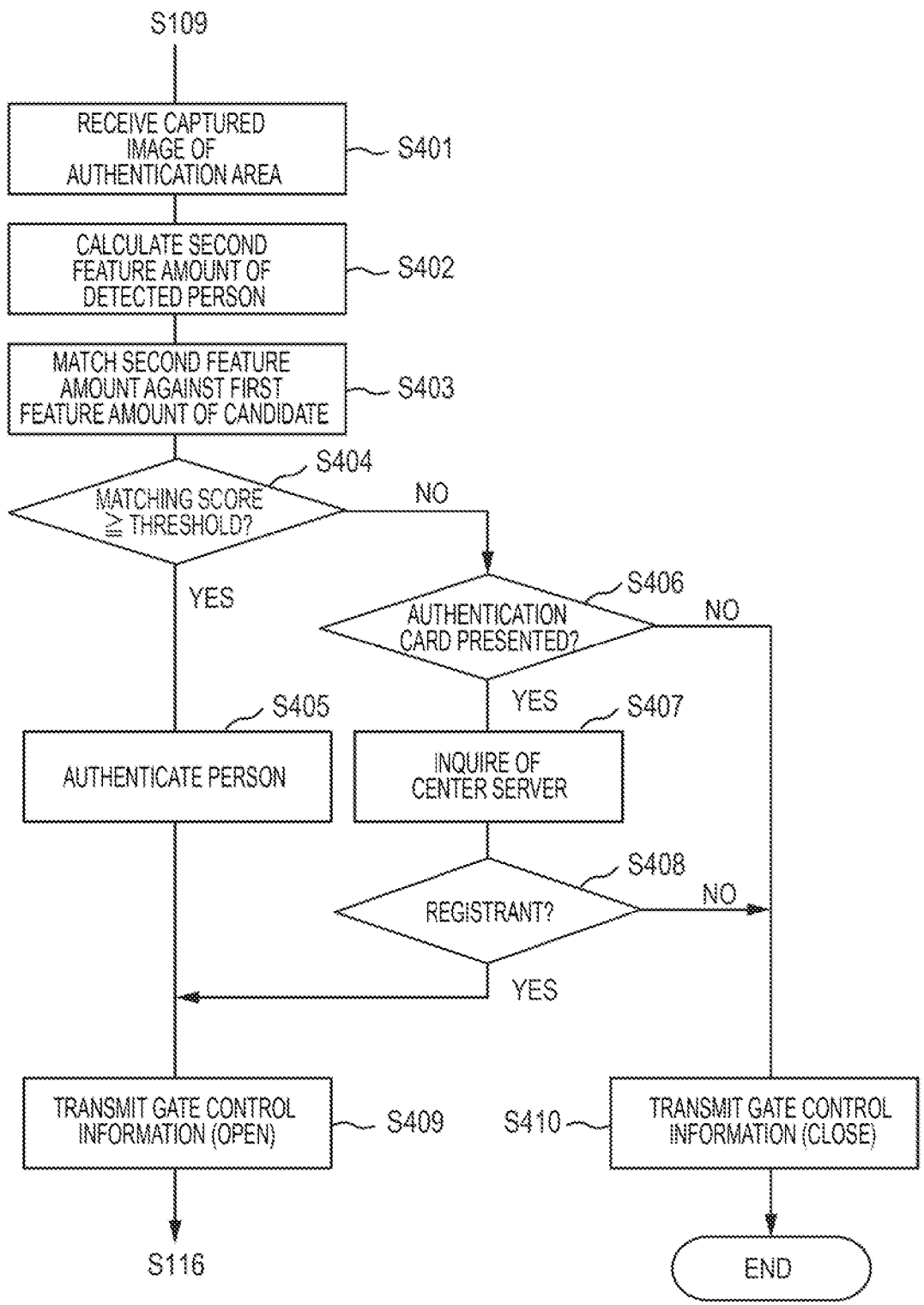
FIG. 17 is a flowchart illustrating one example of the process of a relay server in a modified example embodiment.

While the case where it is determined whether or not a detected person is authorized for passage based on a matching result of feature amounts has been described in the above first example embodiment, a result of determination obtained by a predetermined authentication card (for example, a security card, a transportation IC card, or the like) may be used together with the matching result of feature amounts. FIG. 17 is a flowchart illustrating one example of the process in the relay server 40 in the modified example embodiment. This process is performed between step S109 and step S116 of FIG. 7.

First, the relay server 40 receives a captured image of an authentication area (step S401) and, in response, calculates a second feature amount of a detected person included in the captured image (step S402). Next, the relay server 40 matches the calculated second feature amount against a first feature amount of a candidate (step S403).

Next, the relay server 40 determines whether or not a matching score between the second feature amount of the detected person and the first feature amount of the candidate is greater than or equal to a predetermined threshold (determination reference value) (step S404). In this step, if the relay server 40 determines that the matching score is greater than or equal to the threshold (step S404: YES), the relay server 40 identifies a person having the highest matching score between the feature amounts out of the relevant candidates and authenticates a detected person (step S405). Thereby, the identified candidate (registrant) and the detected person are considered as the identical person. The process then proceeds to step S409. On the other hand, if the relay server 40 determines that the matching score is less than the threshold (step S404: NO), the process proceeds to step S406.

In step S406, the relay server 40 determines whether or not an authentication card is presented from the detected person in the authentication area (authentication subject). In this step, if the relay server 40 determines that an authentication card is presented (step S406: YES), the process proceeds to step S407. On the other hand, if the relay server 40 determines that no authentication card is presented (step S406: NO), the process proceeds to step S410.

In step S407, the relay server 40 inquires of the center server 10 whether or not the authentication subject is a registrant based on authentication information read from the authentication card by a card reader device (not illustrated). Next, the relay server 40 determines whether or not the authentication subject is a registrant based on response information from the center server 10 (step S408). In this step, if the relay server 40 determines that the authentication subject is a registrant (step S408: YES), the process proceeds to step S409. On the other hand, if the relay server 40 determines that the authentication subject is not a registrant (step S408: NO), the process proceeds to step S410.

In step S409, when the relay server 40 transmits gate control information of a gate open instruction to the gate apparatus 50, the process proceeds to step S116. On the other hand, in step S410, when the relay server 40 transmits gate control information of a gate closure instruction to the gate apparatus 50, the process ends.

Further, while the management server 80 has both the registrant information database 11 (the first storage unit 101) and the candidate information database 41 (the second storage unit 402) in the second example embodiment described above, these databases may be aggregated into a single database. FIG. 18 is a diagram illustrating one example of registrant information stored in the management server 80 in the modified example embodiment. In this example, "candidate flag" is added to the data item of the registrant information illustrated in FIG. 6. The candidate flag has the initial value "0" and is updated to "1" when a registrant is identified as a candidate based on a matching result in the authentication area. Then, upon the completion of the matching operation, a candidate flag returns to the initial value "0". That is, candidate information is defined in the registrant information. Thus, by matching a second feature amount of a detected person included in a captured image of the authentication area against a first feature amount of a registrant whose candidate flag is "1", it is possible to obtain the same advantage as that in the second example embodiment described above.

Further, it has been described in the above example embodiments that candidate information is deleted when an authentication subject has passed through the gate apparatus 50, but the deletion condition is not limited thereto. For example, candidate information may be deleted based on whether or not elapsed time from registration date and time of candidate information (registration time) to the current time reaches predetermined time. In such a case, it is possible to prevent candidate information which is no longer necessary due to time elapsing from remaining in the candidate information database 41.

Further, in each of the example embodiments described above, the case where the authentication camera 30 has only the function of transmitting a captured image has been described. However, the authentication camera 30 may further have a function of detecting a person from a captured image and calculating and transmitting the feature amount thereof. In such a case, it is possible to require only the transmission of the feature amount instead of a captured image to the center server 10 or the relay server 40.

Further, while the case where the center server 10 transmits only the face feature amount to the relay server has been described in each of the above example embodiments, a face image of an identified candidate may be transmitted, or an ID of a candidate may be transmitted together with a feature amount or a face image. When a face image is transmitted, it is also possible to create passage history information including a face image of a matched candidate and a face image of the second person. Further, when an ID of a candidate (registrant ID) is transmitted together and held on the relay server 40 side in association with a feature amount, it is possible to extract and delete duplicated candidate information based not only on a matching operation of feature amounts but also on a matching result of the IDs.

Further, while the case where a single relay server 40 is installed to a single base has been described in the above first example embodiment, a plurality of relay servers 40 may be installed to a single base. For example, in a facility in which the number of users is extremely large, installation of the plurality of relay servers 40 provides an advantage that a matching process may be performed in a distributed manner. In such a case, it is preferable to control data registration so that duplicated candidate information is not held between the plurality of relay servers 40.

Further, while two examples: (A) reservation information in a predetermined time range from the current time or (B) reservation information in a predetermined time range after the current time have been illustrated as the extraction condition of reservation information (registration information) in the above first example embodiment, the extraction condition is not limited thereto. For example, the number of persons who made a reservation may be summed up for each range of reservation time (registration time) (for example, on a one-hour or two-hour range basis from certain time, a time span such as 13:00 to 13:59 or 14:00 to 14:59), and the length of a time range (time span) may be changed in accordance with the number of relevant candidates. In such a case, it is preferable to change the length of a time range so as not to exceed the upper limit number of the population in a matching process. In details, when the upper limit number of the population N (for example, 7000) is set in advance so as not to reduce the authentication accuracy, it is preferable to determine what time range of reservation information from the current time is to be targeted so that the upper limit number is not exceeded. Specifically, it is preferable to change the length of the time range so that the time range is shorter for a larger cumulative number of candidates on a registration time range basis. For example, reservation information occurring within 30 minutes from the current time may be targeted when the number of reservations is large (when crowded), and in contrast, for example, reservation information occurring within 3 hours from the current time may be targeted when the number of reservations is small (when not crowded).

The scope of each of the example embodiments further includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the program described above is stored but also the program itself. Further, one or two or more components included in the example embodiments described above may be a circuit such as an ASIC, an FPGA, or the like configured to implement the function of each component.

As the storage medium, for example, a floppy (registered trademark) disk, a hard disk, an optical disk, a magneto-optical disk, a Compact Disk (CD)-ROM, a magnetic tape, a nonvolatile memory card, or a ROM can be used. Further, the scope of each of the example embodiments includes an example that operates on Operating System (OS) to perform a process in cooperation with another software or a function of an add-in board without being limited to an example that performs a process by an individual program stored in the storage medium.

Further, a service implemented by the function of each of the example embodiments described above may be provided to a user in a form of Software as a Service (SaaS).

Note that all the example embodiments described above are mere examples of embodiment in implementing the present invention, and the technical scope of the present invention should not be construed in a limiting sense by these example embodiments. That is, the present invention can be implemented in various forms without departing from the technical concept thereof or the primary feature thereof.

The whole or part of the example embodiments disclosed above can be described as, but not limited to, the following supplementary notes.

(Supplementary Note 1)

An information processing apparatus comprising:

an acquisition unit that, based on registration information including a plurality of registrants and registration time associated with each of the plurality of registrants and on the current time, acquires a first biometrics information group including biometrics information on a candidate of a matching process from a registered biometrics information group including biometrics information on the plurality of registrants; and a matching unit that matches biometrics information on a person detected from an image captured in a matching area against biometrics information included in the first biometrics information group.

(Supplementary Note 2)

The information processing apparatus according to supplementary note 1, wherein the acquisition unit determines, as the candidate, each of the registrants having the registration information in which the registration time is included in a predetermined time range from the current time.

(Supplementary Note 3)

The information processing apparatus according to supplementary note 1, wherein the acquisition unit determines, as the candidate, each of the registrants having the registration information in which the registration time is included in a predetermined time range after the current time.

(Supplementary Note 4)

The information processing apparatus according to supplementary note 2 or 3, wherein the acquisition unit changes a length of the time range based on the number of the registrants for each range of the registration time.

(Supplementary Note 5)

The information processing apparatus according to any one of supplementary notes 2 to 4, wherein the acquisition unit changes a length of the time range so that the cumulative number of candidates does not exceed an upper limit number of a population in the matching process.

(Supplementary Note 6)

The information processing apparatus according to any one of supplementary notes 2 to 5, wherein the acquisition unit changes a length of the time range so that the time range is shorter for a larger cumulative number of candidates for each range of the registration time.

(Supplementary Note 7)

The information processing apparatus according to any one of supplementary notes 1 to 6 further comprising a detection unit that detects biometrics information on the person from the image.

(Supplementary Note 8)

The information processing apparatus according to any one of supplementary notes 1 to 7 further comprising a determination unit that determines whether or not the person is authorized for passage from the matching area to a restricted area based on a matching result in the matching unit.

(Supplementary Note 9)

The information processing apparatus according to supplementary note 8 further comprising a control unit that controls opening or closing of a door of a passage restriction apparatus installed between the restricted area and the matching area based on whether or not the person is authorized for the passage.

(Supplementary Note 10)

The information processing apparatus according to any one of supplementary notes 1 to 9 further comprising:

a storage unit that stores the acquired first biometrics information group; and a deletion unit that deletes, from the first biometrics information group, biometrics information on the person that matches a predetermined condition.

(Supplementary Note 11)

The information processing apparatus according to supplementary note 10, wherein the deletion unit deletes biometrics information on the person when the biometrics information on the person matches biometrics information included in the first biometrics information group.

(Supplementary Note 12)

The information processing apparatus according to supplementary note 10 or 11, wherein the deletion unit deletes biometrics information on the person in which an elapsed time from completion time of registration to the storage unit reaches a predetermined time.

(Supplementary Note 13)

An information processing apparatus comprising:

a storage unit that stores a registered biometrics information group including biometrics information on a plurality of registrants;

an identifying unit that, based on registration information including the plurality of registrants and registration time associated with each of the plurality of registrants and on the current time, identifies a first biometrics information group including biometrics information on a candidate of a matching process from the registered biometrics information group; and a matching unit that matches biometrics information on a person detected from an image captured in a matching area against biometrics information included in the first biometrics information group.

(Supplementary Note 14)

An information processing apparatus comprising:

a storage unit that stores a registered biometrics information group including biometrics information on a plurality of registrants;

an identifying unit that, based on registration information including the plurality of registrants and registration time associated with each of the plurality of registrants and on the current time, identifies a first biometrics information group including biometrics information on a candidate of a matching process from the registered biometrics information group; and an output unit that outputs the first biometrics information group for a matching operation of biometrics information on a person detected in a matching area.

(Supplementary Note 15)

An information processing system comprising:

a camera that captures a matching area to generate an image;

a first server that stores a registered biometrics information group including biometrics information on a plurality of registrants and, based on registration information including the plurality of registrants and registration time associated with each of the plurality of registrants and on the current time, identifies a first biometrics information group including biometrics information on a candidate of a matching process from the registered biometrics information group; and a second server that matches biometrics information on a person detected from the image against biometrics information included in the first biometrics information group.

(Supplementary Note 16)

An information processing method comprising:

based on registration information including a plurality of registrants and registration time associated with each of the plurality of registrants and on the current time, acquiring a first biometrics information group including biometrics information on a candidate of a matching process from registered biometrics information group including biometrics information on the plurality of registrants; and matching biometrics information on a person detected from an image captured in a matching area against biometrics information included in the first biometrics information group.

(Supplementary Note 17)

The information processing method according to supplementary note 16, wherein the acquiring the first biometrics information group includes determining, as the candidate, each of the registrants having the registration information in which the registration time is included in a predetermined time range from the current time.

(Supplementary Note 18)

The information processing method according to supplementary note 16, wherein the acquiring the first biometrics information group includes determining, as the candidate, each of the registrants having the registration information in which the registration time is included in a predetermined time range after the current time.

(Supplementary Note 19)

The information processing method according to supplementary note 17 or 18, wherein the acquiring the first biometrics information group includes changing a length of the time range based on the number of the registrants for each range of the registration time.

(Supplementary Note 20)

The information processing method according to any one of supplementary notes 17 to 19, wherein the acquiring the first biometrics information group includes changing a length of the time range so that the cumulative number of candidates does not exceed an upper limit number of a population in the matching process.

(Supplementary Note 21)

The information processing method according to any one of supplementary notes 17 to 20, wherein the acquiring the first biometrics information group includes changing a length of the time range so that the time range is shorter for a larger cumulative number of candidates for each range of the registration time.

(Supplementary Note 22)

The information processing method according to any one of supplementary notes 16 to 21 further comprising:

detecting biometrics information on the person from the image.

(Supplementary Note 23)

A program that causes a computer to perform:

based on registration information including a plurality of registrants and registration time associated with each of the plurality of registrants and on the current time, acquiring a first biometrics information group including biometrics information on a candidate of a matching process from a registered biometrics information group including biometrics information on the plurality of registrants; and matching biometrics information on a person detected from an image captured in a matching area against biometrics information included in the first biometrics information group.

What is claimed is:

1. An information processing apparatus comprising:
a memory configured to store one or more instructions; and
a processor configured to execute the one or more instructions to:
capture an image of a matching area;
acquire first biometrics information of one or more first registrants among a plurality of registrants, the first biometrics information of the one or more first registrants being generated by extracting from biometrics information of the plurality of registrants based on reservation information related to the plurality of registrants and an extraction condition, the first biometrics information comprising information on a plurality of reservation persons, selected based on the reservation information comprising, a reservation time associated with each of the plurality of reservation persons, and based on a current time, and the first biometrics information of the one or more first registrants corresponding to a smaller subset of registrants than biometrics information of the plurality of registrants;
perform a matching process of matching second biometrics information of a person detected in the image with the first biometrics information of the one or more first registrants;
based on the matching process not being successful, determine whether the person is a registrant, among the one or more first registrants, based on an authentication card;
based on the matching process being successful or the person being authenticated as one of the one or more first registrants based on the authentication card, allow the person to pass through the matching area to a restricted area; and
restrict the person from passing through the matching area based on the person not being authorized as one of the one or more first registrants based on the authentication card.

2. The information processing apparatus according to claim 1, wherein the processor is further configured to execute the one or more instructions to determine, as a candidate, one or more registrants, among the plurality of registrants, having registration information in which a registration time is included in a predetermined time range from the current time.

3. The information processing apparatus according to claim 1, wherein the processor is further configured to execute the one or more instructions to determine, as a candidate, each of the registrants having registration information in which a registration time is included in a predetermined time range after the current time.

4. The information processing apparatus according to claim 2, wherein the processor is further configured to execute the one or more instructions to change a length of the predetermined time range based on a number of the registrants for each range of the registration time.

5. The information processing apparatus according to claim 2, wherein the processor is further configured to execute the one or more instructions to change a length of the predetermined time range so that a cumulative number of candidates does not exceed an upper limit number of a population in the matching process.

6. The information processing apparatus according to claim 2, wherein the processor is further configured to execute the one or more instructions to change a length of the predetermined time range so that a time range is shorter for a larger cumulative number of candidates for each range of the registration time.

7. The information processing apparatus according to claim 1, wherein the processor is further configured to execute the one or more instructions to control opening or closing of a door of a passage restriction apparatus installed between the restricted area and the matching area when the matching process is successful or the person is authorized as the registrant based on the authentication card.

8. The information processing apparatus according to claim 1, wherein the processor is further configured to execute the one or more instructions to:
control storage of the first biometrics information; and
delete, from the first biometrics information, registered biometrics information on a person that matches a predetermined condition.

9. The information processing apparatus according to claim 8, wherein the processor is further configured to execute the one or more instructions to delete the registered biometrics information on the person when the biometrics information on the person matches the registered biometrics information included in the first biometrics information.

10. The information processing apparatus according to claim 8, wherein the processor is further configured to execute the one or more instructions to delete the registered biometrics information on the person in which an elapsed time from completion time of registration reaches a predetermined time.

11. The information processing apparatus according to claim 1,
wherein the reservation information includes information about at least one of reserving a use of a facility and reserving a service.

12. An information processing system comprising:
a camera that captures an image of a matching area;
a first server that stores biometrics information of a plurality of registrants; and
a second server configured to:
acquire first biometrics information of one or more first registrants among the plurality of registrants, the first biometrics information of the one or more first registrants being generated by extracting from biometrics information of the plurality of registrants based on reservation information related to the plurality of registrants and an extraction condition, the first biometrics information comprising information on a plurality of reservation persons, selected based on the reservation information comprising, a reservation time associated with each of the plurality of reservation persons, and based on a current time, and the first biometrics information of the one or more first registrants corresponding to a smaller subset of registrants than biometrics information of the plurality of registrants; perform a matching process of matching second biometrics information of a person detected in the image with the first biometrics information of the one or more first registrants;
based on the matching process not being successful, determine whether the person is a registrant, among the one or more first registrants, based on an authentication card;
based on the matching process being successful or the person being authenticated as one of the one or more first registrants based on the authentication card, allow the person to pass through the matching area to a restricted area; and
restrict the person from passing through the matching area based on the person not being authorized as one of the one or more first registrants based on the authentication card.

13. An information processing method comprising:
capturing an image of a matching area;
acquiring first biometrics information of one or more first registrants among a plurality of registrants, the first biometrics information of the one or more first registrants being generated by extracting from biometrics information of the plurality of registrants based on reservation information related to the plurality of registrants and an extraction condition, the first biometrics information comprising information on a plurality of reservation persons, selected based on the reservation information comprising, a reservation time associated with each of the plurality of reservation persons, and based on a current time, and the first biometrics information of the one or more first registrants corresponding to a smaller subset of registrants than biometrics information of the plurality of registrants;
performing a matching process of matching second biometrics information of a person detected in the image with the first biometrics information of the one or more first registrants;
based on the matching process not being successful, determining whether or not the person is a registrant, among the one or more first registrants, based on an authentication card;
based on the matching process being successful or the person being authorized as one of the one or more first registrants based on the authentication card, allowing the person to pass through the matching area to a restricted area; and
restrict the person from passing through the matching area based on the person not being authorized as one of the one or more first registrants based on the authentication card.

14. The information processing method according to claim 13, wherein the first biometrics information includes information on a plurality of reservation persons, selected based on reservation information including, a reservation time associated with each of the plurality of reservation persons, and based on a current time.

15. The information processing method according to claim 14, wherein the acquiring the first biometrics information includes determining, as a candidate, each of the registrants having registration information in which a registration time is included in a predetermined time range from the current time.

16. The information processing method according to claim 14, further comprising determining, as a candidate, each of the registrants having registration information in which a registration time is included in a predetermined time range after the current time.

17. The information processing method according to claim 15, wherein the acquiring the first biometrics information includes changing a length of the predetermined time range based on a number of the registrants for each range of the registration time.

18. The information processing method according to claim 15, wherein the acquiring the first biometrics information includes changing a length of the predetermined time range so that a cumulative number of candidates does not exceed an upper limit number of a population in the matching process.

19. The information processing method according to claim 15, wherein the acquiring the first biometrics information includes changing a length of the predetermined time range so that a time range is shorter for a larger cumulative number of candidates for each range of the registration time.

20. The information processing method according to claim 13, wherein the reservation information includes information about at least one of reserving a use of a facility and reserving a service.

21. The information processing apparatus according to claim 1, the processor is further configured to determine whether or not a matching score between the second biometrics information of the person detected in the image and the first biometrics information of the one or more registrants is greater than or equal to predetermined threshold; and when the matching score is less than the predetermined threshold, determine whether or not the person is a registrant, among the one or more registrants, based on an authentication card.

22. The information processing method according to claim 13, further comprising determining whether or not a matching score between the second biometrics information of the person detected in the image and the first biometrics information of the one or more registrants is greater than or equal to predetermined threshold; and when the matching score is less than the predetermined threshold, determining whether or not the person is a registrant, among the one or more registrants, based on an authentication card.

* * * * *